US012732083B1

(12) United States Patent
Kancharla et al.

(10) Patent No.: US 12,732,083 B1
(45) Date of Patent: Sep. 8, 2026

(54) POWER LOAD BANK CART TO IMPROVE MAGNETIC FIELD GRADING FOR A PUMP

(71) Applicant: ARoboticsCompany, Inc, Ossining, NY (US)

(72) Inventors: Akaash Reddy Kancharla, Ossining, NY (US); Jack Norleans, Ossining, NY (US); Nicola Mario Altomare, Ossining, NY (US)

(73) Assignee: AROBOTICSCOMPANY, INC, Ossining, NY (US)

(*) Notice: Subject to any disclaimer, the term of this patent is extended or adjusted under 35 U.S.C. 154(b) by 0 days.

(21) Appl. No.: 19/532,386

(22) Filed: Feb. 6, 2026

(51) Int. Cl.

| | |
|---|---|
| ***H02K 44/06*** | (2006.01) |
| ***H02J 3/00*** | (2006.01) |
| ***H02M 1/32*** | (2007.01) |
| ***H02M 5/06*** | (2006.01) |

(52) U.S. Cl.
CPC ................ *H02K 44/06* (2013.01); *H02J 3/00* (2013.01); *H02M 1/327* (2021.05); *H02M 5/06* (2013.01)

(58) Field of Classification Search
CPC .......... H02K 44/06; H02J 3/00; H02M 1/327; H02M 5/06
See application file for complete search history.

(56) References Cited

U.S. PATENT DOCUMENTS

2014/0021890 A1* 1/2014 Herrera ..................... H02P 3/02 241/36
2026/0019016 A1* 1/2026 Simmons .................. H02P 9/14

FOREIGN PATENT DOCUMENTS

CN 121633927 A * 3/2026 ............. G01R 35/02

* cited by examiner

*Primary Examiner* — Daniel Cavallari
(74) *Attorney, Agent, or Firm* — Buckley, Maschoff & Talwalkar LLC

(57) ABSTRACT

A power load bank apparatus may include a master switch selectable between a series configuration and a parallel configuration. An input port of the power load bank may receive three phases of Alternating Current ("AC") power from a power grid. A set of tuning elements may be provided, with each tuning element including a tunable rheostat and a rheostat bypass breaker. An output port may provide a tuned power output based on tuned rheostats in the set of tuning elements and the selected configuration, and a cooling system may keep the power load bank at a safe temperature. An interactive user display may be used to determine power load bank parameters.

17 Claims, 13 Drawing Sheets

1100

| POWER LOAD BANK IDENTIFIER 1102 | DEVICE STATUS 1104 | DATE (TIME) 1106 | STATUS OF INPUTS AND OUTPUTS 1108 | OVERHEATING WARNING 1110 |
|---|---|---|---|---|
| PLB_1001 | ONLINE | 7/11/2028 (14:45.40) | | NONE |
| PLB_1002 | ONLINE | 7/11/2028 (11:02.28) | | ALERT |
| PLB_1003 | OFFLINE | 7/11/2028 (08:28.32) | | NONE |

*FIG. 11*

POWER LOAD BANK CART TO IMPROVE MAGNETIC FIELD GRADING FOR A PUMP

TECHNICAL FIELD

Some embodiments are directed to magnetic field grading for a pump. In particular, embodiments disclose devices and methods for a power load bank cart.

BACKGROUND

Magnetic field grading is known to impact pumping efficiency, such as for an Annular Linear Induction Pump ("ALIP"). Previous attempts at magnetic field grading in an ALIP involved physically constructing ALIP coils with different numbers of turns of conductors. This method is very inefficient and time consuming for sampling many different grading arrangements, because changing the turns on a coil requires a complete disassembly of ALIP followed by a time-consuming reassembly of ALIP. In addition, slight variations in ALIP assembly may affect repeatability of test results between different magnetic field gradings.

A need exists for systems and methods to improve magnetic field grading for a pump.

SUMMARY

According to some embodiments, a power load bank apparatus may include a master switch selectable between a series configuration and a parallel configuration. An input port of the power load bank may receive three phases of AC power from a power grid. A set of tuning elements may be provided, with each tuning element including a tunable rheostat and a rheostat bypass breaker. An output port may provide a tuned power output based on tuned rheostats in the set of tuning elements and the selected configuration, and a cooling system may keep the power load bank at a safe temperature. An interactive user display may be used to determine power load bank parameters.

Some embodiments comprise: means for selecting, via a master switch, between a series configuration and a parallel configuration; means for providing, via an input port, three phases of AC power from a power grid; means for tuning a set of tuning elements, each tuning element including a tunable rheostat and a rheostat bypass breaker; means for providing, from an output port, a tuned power output based on tuned rheostats in the set of tuning elements and the selected configuration; means for keeping the power load bank at a safe temperature using a cooling system; and means for interacting with an interactive user display to determine power load bank parameters.

Some technical advantages of some embodiments disclosed herein are improved systems and methods to improve magnetic field grading for a pump.

BRIEF DESCRIPTION OF THE DRAWINGS

FIG. 11 is a power load bank database in accordance with some embodiments,

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Some embodiments described herein take in a source current and distribute individually controlled currents across many outputs via rheostats. The device may have the ability to communicate with copies of itself and a central hub for increased scale applications. Communicated information might include device status, status of inputs and outputs, overheating warnings, etc. Embodiments may, for example, be useful in applications such as electromagnetic pumps. Embodiments may allow for precise control and optimization of current input to each of a number of solenoids to tune the resulting magnetic field strength and direction. Controlling the current on each coil in this way allows for rapid iteration and the ability to correct settings to produce an ideal outcome in real-time. The load bank may be designed for maximum current grading flexibility, as well as being responsive to user inputs, self-regulation to prevent overheating, portability, etc.

Figure 1:
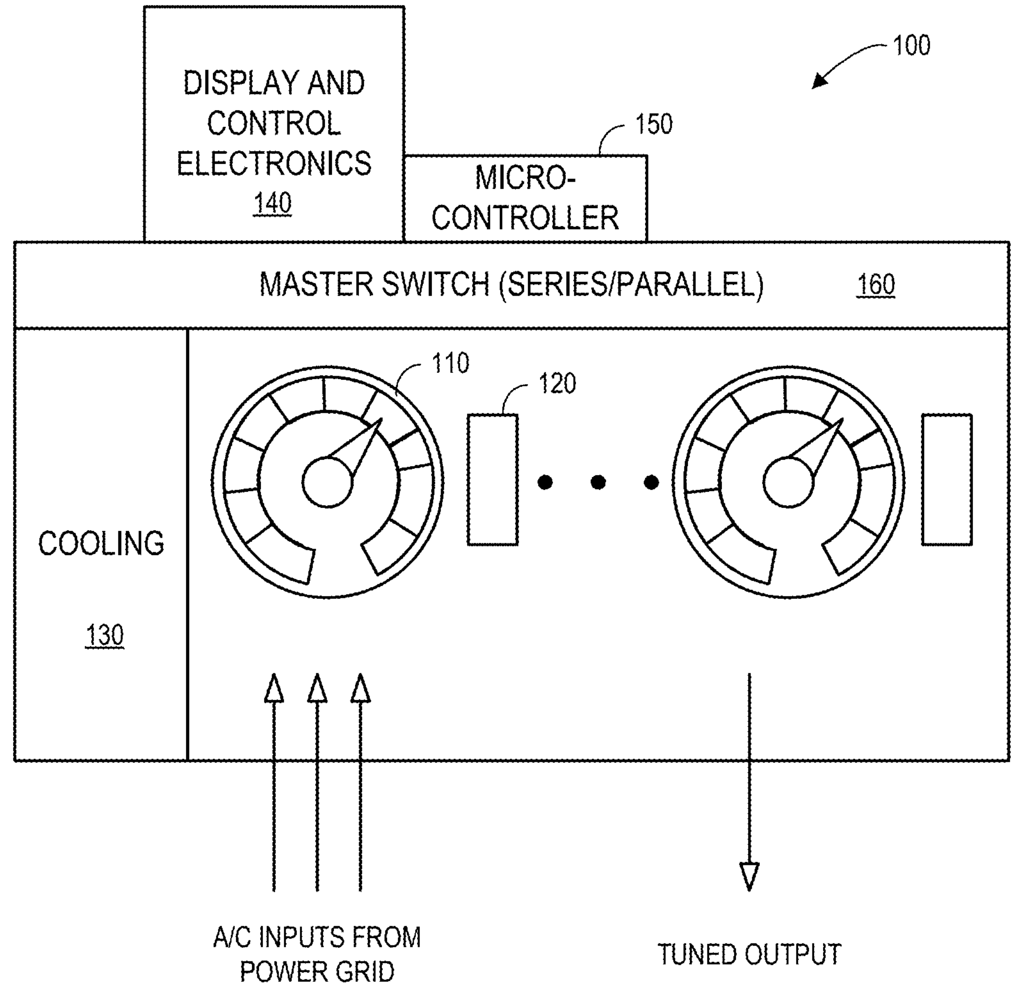
FIG. 1 is a power load bank according to some embodiments.
Figure 2:
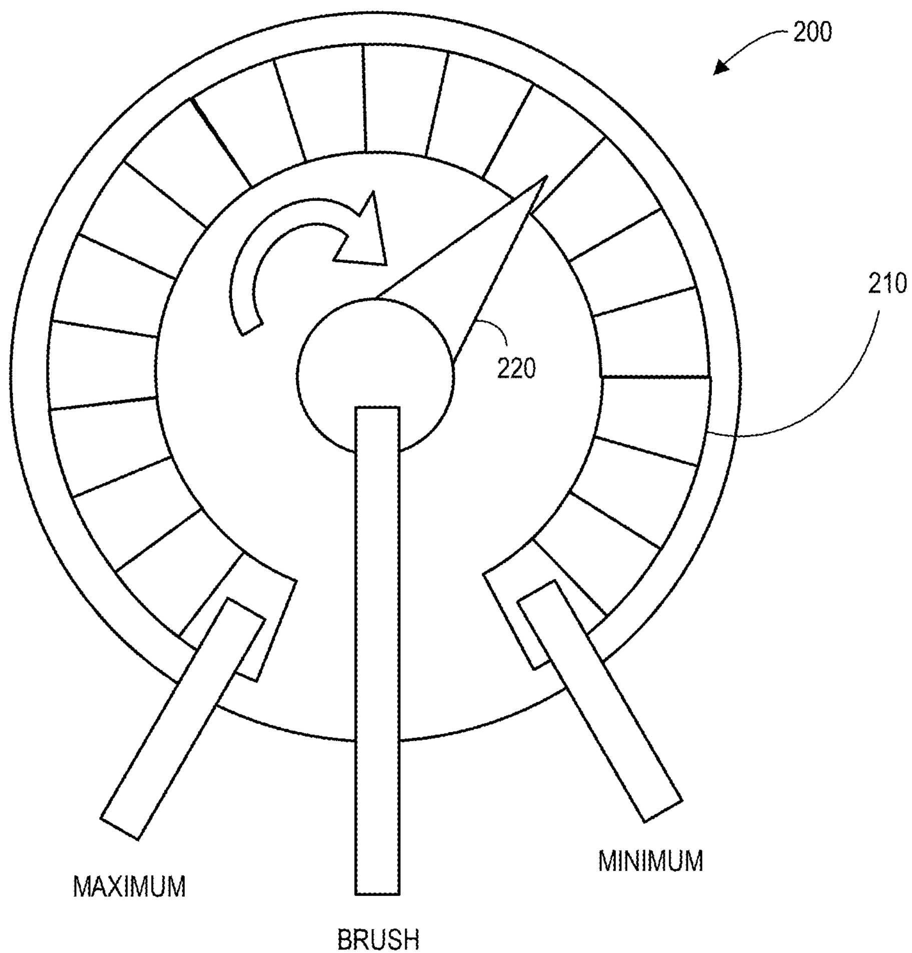
FIG. 2 is a rheostat in accordance with some embodiments.

FIG. 1 is a power load bank 100 in accordance with some embodiments. A set of tuning elements may include, for each tuning element, a tunable rheostat 110 and a rheostat bypass breaker 120 (e.g., a switch to remove the rheostat 200 completely). For example, FIG. 2 is a rheostat 200 in accordance with some embodiments. The rheostat 200 has a rotatable wiper or brush 220 in contact with resistive elements 210. By rotating the brush 220 the amount of resistance of the rheostat 200 may be adjusted from a minimum value to a maximum value.

Referring again to FIG. 1, the power load bank 100 may have one or more input ports to receive three phases of Alternating Current ("AC") power from a power grid and further include a cooling system 130 to keep the power load bank 100 at a safe temperature. The cooling system 130 may comprise, for example, a set of fans. Display and control electronics 140 may be used by an operator to configure and/or monitor the power load bank 100 via a microcontroller 150, such as via an interactive user display. A master switch 160 may be selectable between a series configuration and a parallel configuration. The power load band 100 may have an output port that provide a tuned power output based on the tuned rheostats 110 in the set of tuning elements and a selected configuration.

Embodiments might, for example, be used in connection with electromagnetic pumps. These have applications for pumping electrically conductive materials such as sodium, molten salts, or other molten metals. They are primarily used in heat exchangers for nuclear applications. The magnetic field produced by each ALIP coil is expected to vary linearly with the current sent through each coil. The magnetic field produced by a solenoid is approximated by the following formula:

$$B = \frac{\mu_0 \cdot N \cdot I}{L}$$

where $\mu_0$ is a constant, L is the length of the solenoid, and Nis the total number of turns around the solenoid body. From this model of solenoid magnetic field, it can be seen that varying the current (I) will directly increase or decrease the magnetic field strength (B).

The three phase AC power may be supplied to the power load bank 100, for example, by a Pacific Power Source 3150AFX-2A. This power supply takes in (from the wall) 208 V three-phase at a recommended input service of 60 A rms. The desired per phase current requested for an ALIP system might be, for example, 20 A per phase at 10 Hz. A 15 kVa power supply may be capable of pushing up to 41.7 A rms per phase in three-phase mode at 300 V rms. The frequency range of a power supply in ab extended mode may be, for example, from 1 Hz to 3000 Hz. When operating in the extended range of the power supply, the power output derates which is why the supply may be overspecified on its per phase current output. The power supply may be connected to the power load bank 100 via a large four-pin aviation connector. The power load bank 100 may have an emergency disconnect on a front panel that is then fed to the load bank along with Controller Area Network ("CAN") communication via a seven-pin aviation connector. CAN communication is a message-based protocol that enables microcontrollers and devices, such as an Electronic Control Unit ("ECU") to communicate in a decentralized network without a host computer in accordance with the International Organization for Standards 11898 protocol.

The power load bank 100 may let an operator adjust the current going through each individual coil across a large range to enable highly variable magnetic fields, up to the limits of the three-phase power supply being used to drive ALIP during testing. This variable current is accomplished by providing a variable resistor (or rheostat) in parallel with each coil. The operating model of the power load bank 100 is taken directly from Ohm's law, specifically its implications for parallel circuits and current dividers. With each phase of the power supply being configured as a constant current source, using current dividers:

$$I_{Coil} = \left(\frac{R_{variable}}{R_{coil} + R_{variable}}\right) \cdot I_{Source}$$

and the fundamentals of current in parallel circuits:

$$I_{Total} = I_1 + I_2 + \ldots + I_N,$$

and different currents can be fed into each coil by adjusting the resistance of each rheostat in parallel with a coil. Each rheostat can also be isolated from its paired coil, allowing the coil to draw the full current offered by the three-phase power supply. The varied current is activated by closing breaker switches to connect a rheostat in parallel with a coil and then varying the resistance of the rheostats.

Figure 3:
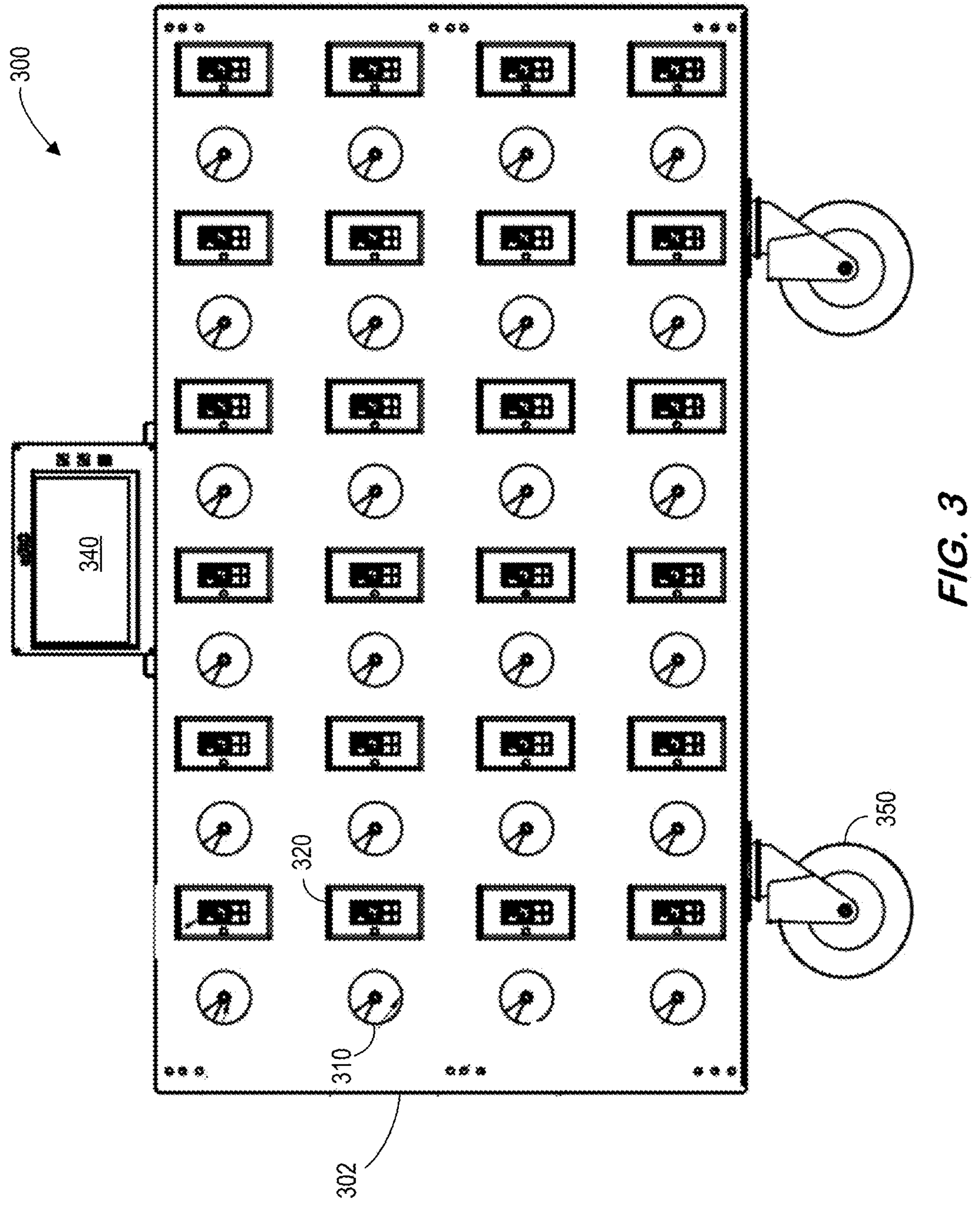
FIG. 3 is a more detailed front view of a power load bank according to some embodiments.

FIG. 3 is a more detailed front view of a power load bank 300 according to some embodiments. A chassis 302 may be, for example, a standard 19" steel network rack cart. The frame may be made of two 0.25" thick aluminum plates, and four 0.125" thick aluminum plates. These plates were Computer Numerical Control ("CNC") machined to accommodate all electronic hardware components. The load bank may have 24 adjustable coil slots. With a majority of the weight being on the front panel of the power load bank 300, the plate thickness may be varied such that the cart is not prone to tipping. The power load bank 300 has a set of 24 tuning elements, each tuning element including a tunable rheostat 310 (e.g., 200 W 200Ω rheostats) and a rheostat bypass breaker 320 (e.g., a resettable circuit breaker). An interactive user display 340 may let a user configure and/monitor operation of the power load bank 300. Four caster wheels 350 may let the power load bank 300 be easily moved by an operator.

Figure 4A:
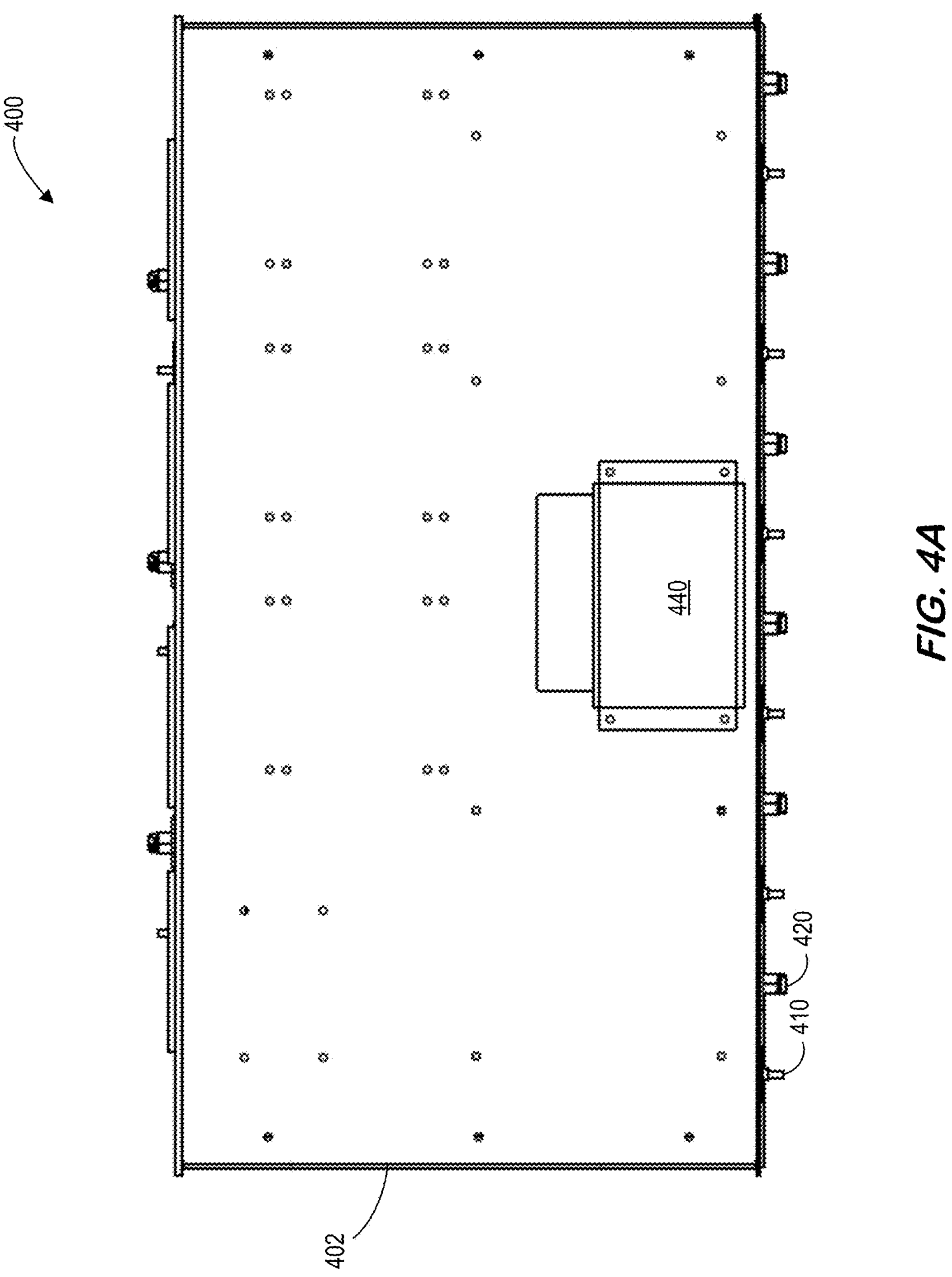
FIG. 4A is a top view of a power load bank in accordance with some embodiments.
Figure 4B:
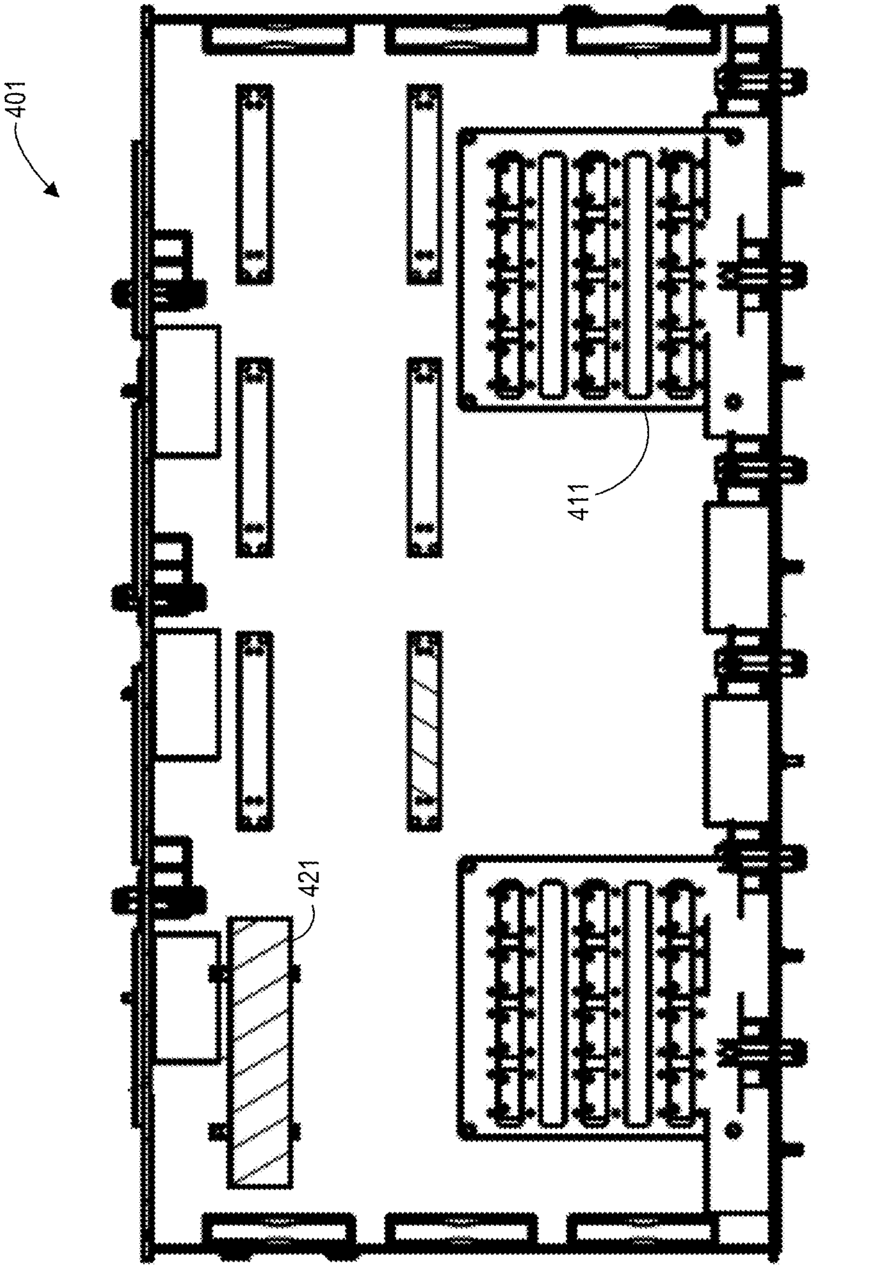
FIG. 4B is an internal view of a power load bank according to some embodiments.

FIG. 4A is a top view of a power load bank 400 in accordance with some embodiments. A chassis 402 may have a set of tuning elements, each tuning element including a tunable rheostat 410 and a rheostat bypass breaker 420. control electronics 440 (including a display screen) may let a user configure and/monitor operation of the power load bank 400. FIG. 4B is an internal view of a power load bank 401 according to some embodiments. Here, the top of the load bank 401 has been removed exposing current sensors 411 (e.g., 20 A ACS712 current sensors) and a power supply 421 (e.g., a 12 V power supply). Other components of the power load bank 400 might include a 5 V 1 A buck converter, a Raspberry Pi 5, an Arduino Mega, a Raspberry Pi screen, Serial Peripheral Interface ("SPI") CAN shields, a 5 V 5 A buck converter, etc.

Figure 5:
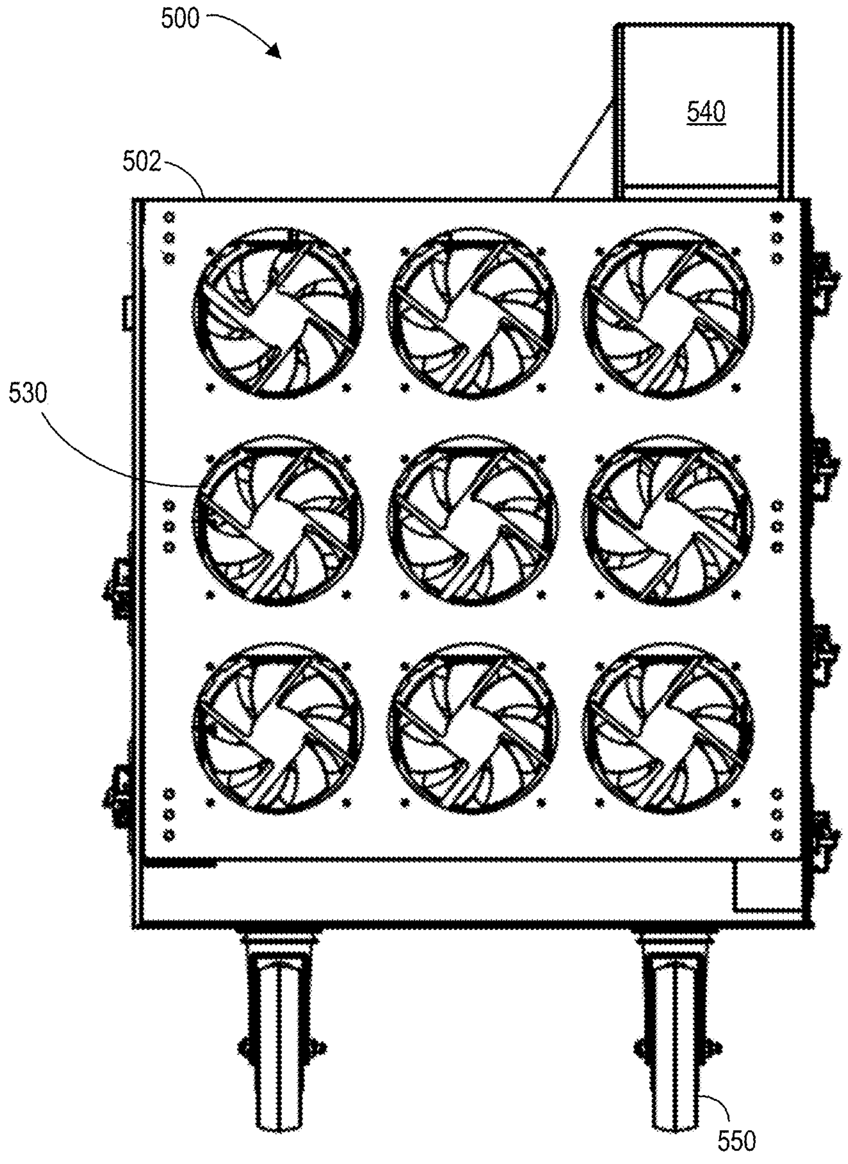
FIG. 5 is a side view of a power load bank in accordance with some embodiments.
Figure 6:
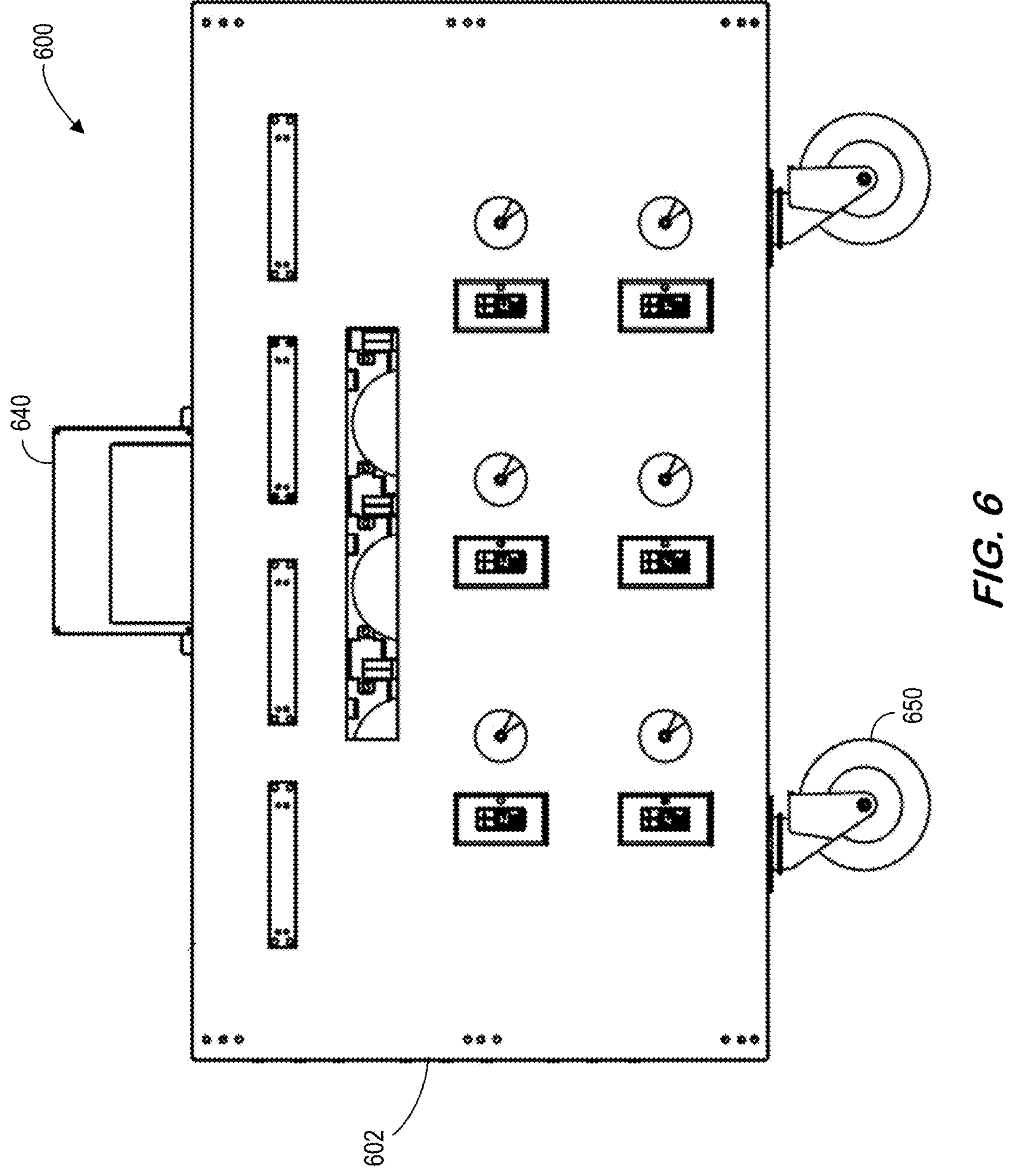
FIG. 6 is a back view of a power load bank according to some embodiments.
Figure 7:
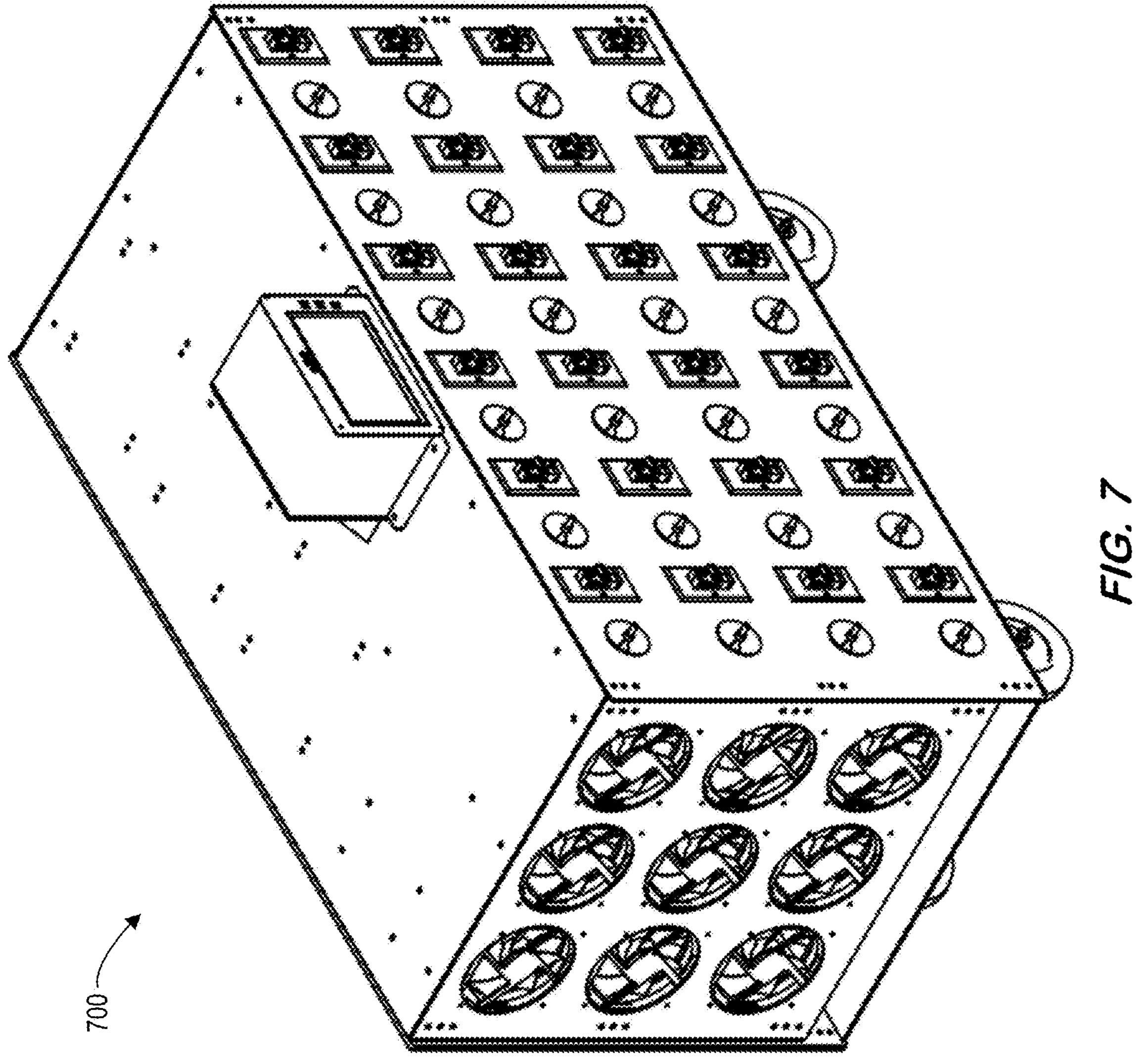
FIG. 7 is a power load bank in accordance with some embodiments.

FIG. 5 is a side view of a power load bank 500 in accordance with some embodiments. A chassis 502 may contain a cooling system 530 to keep the power load bank at a safe temperature. For example, the power load bank 500 may have intake and exhaust Personal Computer ("PC") fans mounted on each side providing ample cooling for the rheostats. The fans may be always on once the cart is plugged into a standard 120 V National Electrical Manufacturers Association ("NEMA") wall outlet and be nearly inaudible. As before, the power load bank 500 may have control electronics 540 and caster wheels 550. FIG. 6 is a back view of a power load bank 600 including a chassis 602, control electronics 640, and caster wheels 650 according to some embodiments. According to some embodiments, the power load bank 600 further has load distribution bars and additional rheostats. FIG. 7 is a power load bank 700 in accordance with some embodiments.

Figure 8:
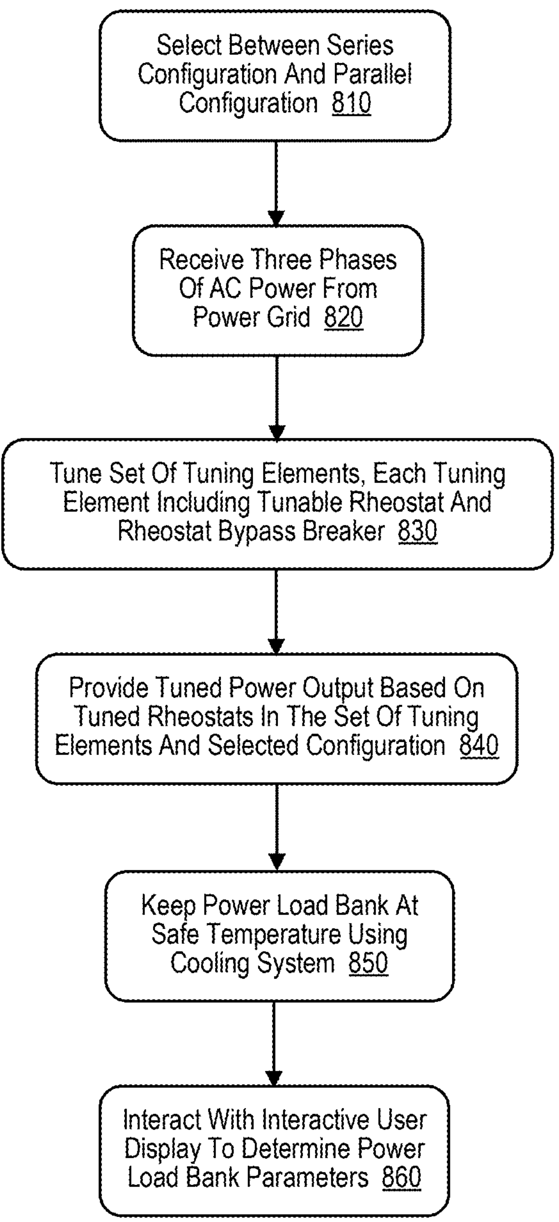
FIG. 8 is a power load bank method according to some embodiments.

FIG. 8 is a power load bank method that might be performed by some or all of the elements of the device 200 described herein in connection with FIG. 2 (or any of the other embodiments). The flow chart described herein does not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At 810, a master switch may be used to select between a series configuration and a parallel configuration. At 820, an input port may be used to provide three phases of AC power from a power grid. At 830, a set of tuning elements, each tuning element including a tunable rheostat and a rheostat bypass breaker, are tuned. At 840, an output port provides a tuned power output based on tuned rheostats in the set of tuning elements and the selected configuration. At 850, a cooling system keeps the power load bank at a safe temperature, and an operator may interact with an interactive user display to determine power load bank parameters at S860.

Figure 9:
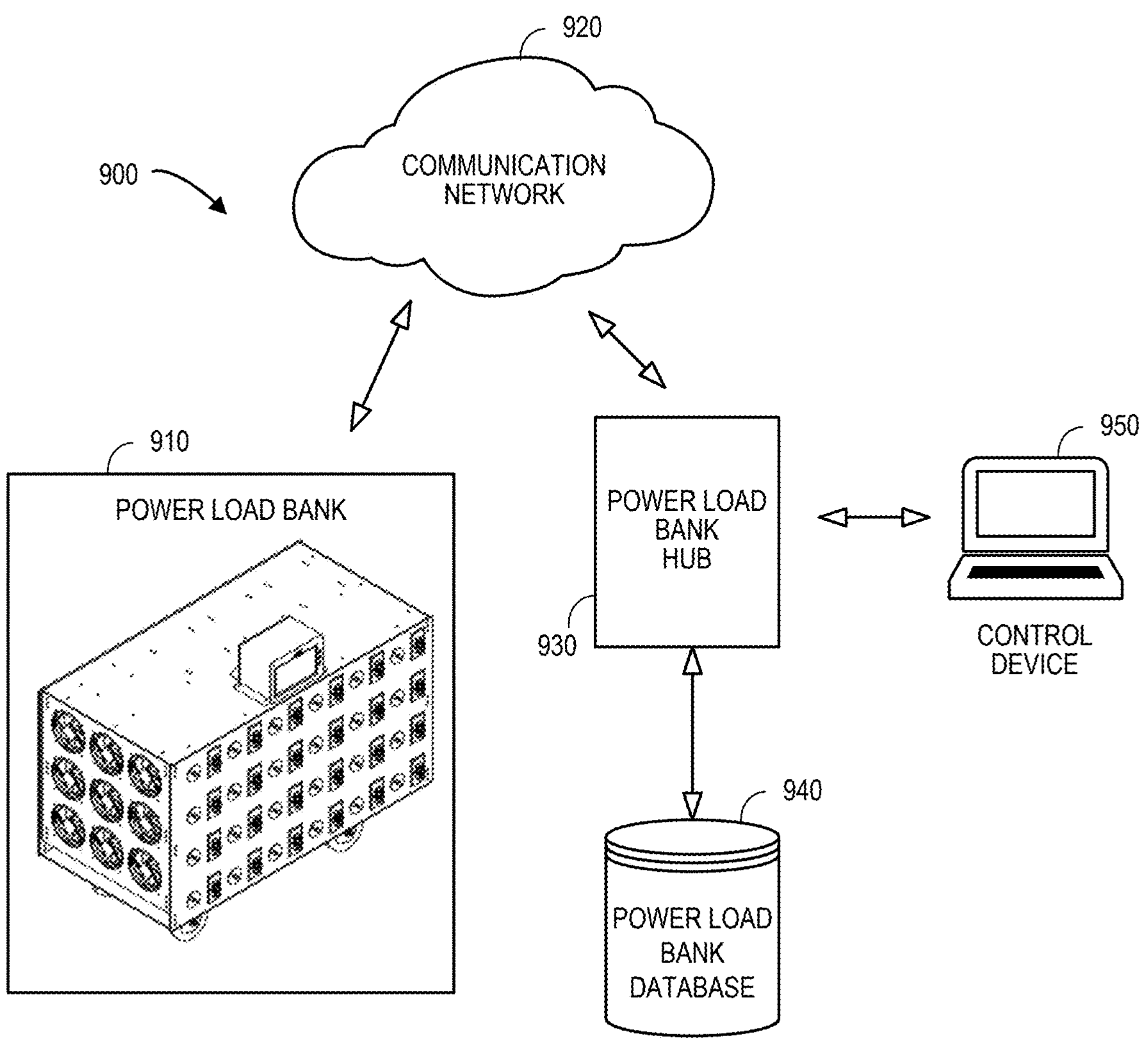
FIG. 9 is a power load bank communication system in accordance with some embodiments.

FIG. 9 is a power load bank communication system 900 according to some embodiments. A power load bank 910 may exchange information with a power load bank hub 930 via a communication network 920. Some or all of the processes described herein might be performed automatically or be initiated via a command from a control device 950. As used herein, the term "automatically" may refer to, for example, actions that can be performed with little or no human intervention.

As used herein, devices, including those associated with the system 900 and any other device described herein, may exchange information via any communication network which may be one or more of a hard-wired network, a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The power load bank hub 930 may store information into and/or retrieve information from various data stores (e.g., a power load bank database 940), which may be locally stored or reside remote from the power load bank hub 930. Although a single power load bank hub 930 is shown in FIG. 9, any number of such devices may be included. Moreover, various devices described herein might be combined according to embodiments of the present invention. For example, in some embodiments, the power load bank hub 930 and the power load bank database 940 might comprise a single apparatus. Any of the system 900 functions may be performed by a constellation of networked apparatuses, such as in a distributed processing or cloud-based architecture.

Figure 10:
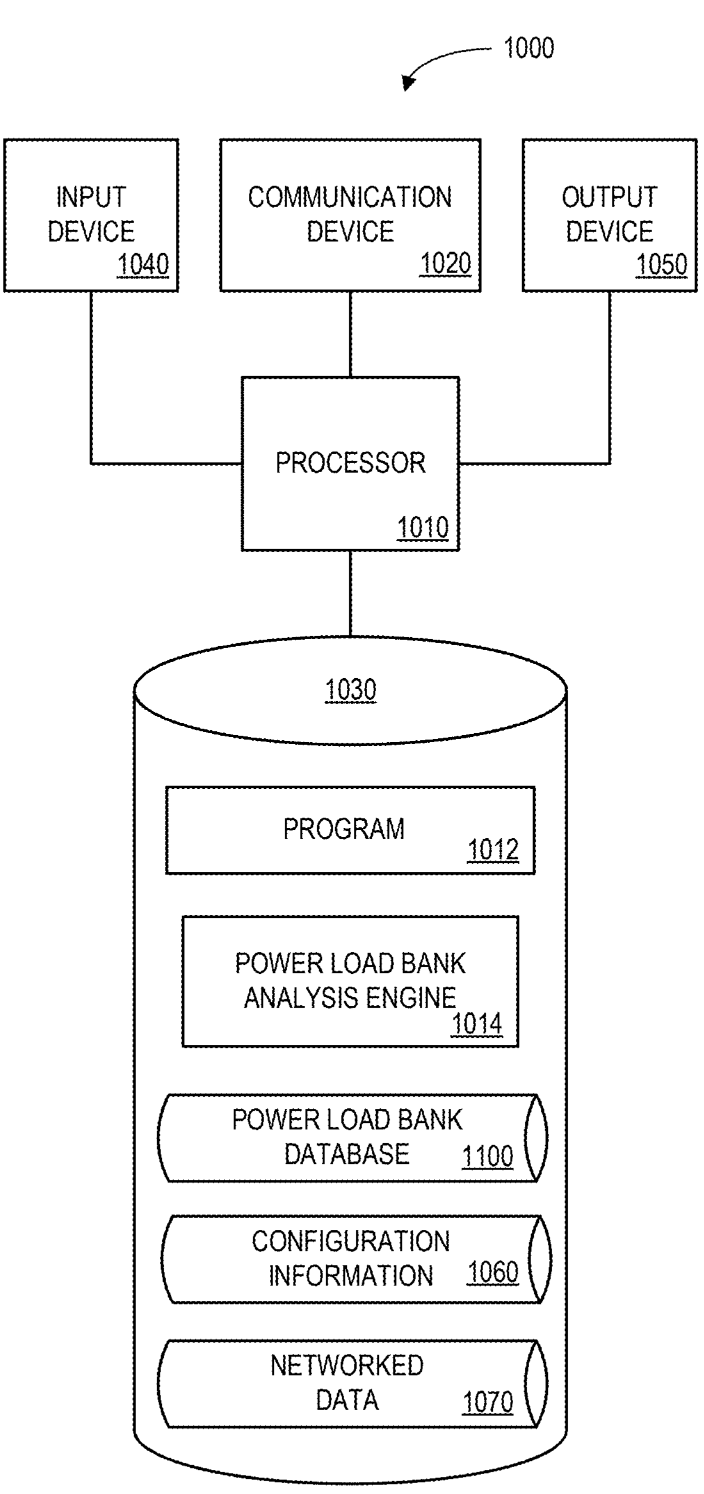
FIG. 10 is a platform or apparatus in accordance with some embodiments according to some embodiments.

The embodiments described herein may be implemented using any number of different hardware configurations. For example, FIG. 10 illustrates a platform or apparatus 1000 that may be, for example, associated with the power load bank 100 of FIG. 1 as well as any of the other systems described herein. The apparatus 1000 comprises a processor 1010, such as one or more commercially available Central Processing Units ("CPUs") in the form of one-chip microprocessors, coupled to a communication device 1020 configured to communicate via a communication network (not shown in FIG. 10). The communication device 1020 may be used to communicate, for example, with one or more remote analysis systems. The apparatus 1000 further includes an input device 1040 (e.g., a mouse and/or keyboard to define configuration parameters) and an output device 1050 (e.g., a computer monitor to display reports and tuning results).

The processor 1010 also communicates with a storage device 1030. The storage device 1030 may comprise any appropriate information storage device, including combinations of magnetic storage devices (e.g., a hard disk drive), optical storage devices, mobile telephones, and/or semiconductor memory devices. The storage device 1030 stores a program 1012 and/or a power load bank analysis engine 1014 for controlling the processor 1010. The processor 1010 performs instructions of the programs 1012, 1014, and thereby operates in accordance with any of the embodiments described herein. For example, the processor 1010 may let an operator use an interactive user display to determine power load bank parameters.

The programs 1012, 1014 may be stored in a compressed, uncompiled and/or encrypted format. The programs 1012, 1014 may furthermore include other program elements, such as an operating system, a database management system, and/or device drivers used by the processor 1010 to interface with peripheral devices.

As used herein, information may be "received" by or "transmitted" to, for example: (i) the apparatus 1000 from another device; or (ii) a software application or module within the apparatus 1000 from another software application, module, or any other source.

In some embodiments (such as shown in FIG. 10), the storage device 1030 further stores a power load bank database 1100, configuration information 1060, and networked data 1070. An example of a database that may be used in connection with the apparatus 1000 will now be described in detail with respect to FIG. 11. Note that the database described herein is only one example, and additional and/or different information may be stored therein. Moreover, various databases might be split or combined in accordance with any of the embodiments described herein.

Referring to FIG. 11, a table is shown that represents the power load bank database 1100 that may be stored at the apparatus 1000 according to some embodiments. The table may include, for example, entries identifying a number of power load bank devices that have been deployed. The table may also define fields 1102, 1104, 1106, 1108, 1110 for each of the entries. The fields 1102, 1104, 1106, 1108, 1110 may, according to some embodiments, specify: a power load bank identifier 1102, a device status 1104, a date and time 1106, status of inputs and outputs 1108, and an overheating warning 1110. The power load bank database 1100 may be created and updated, for example, based on information received from a power load bank device, a project administrator, when parameters are tuned, etc.

The power load bank identifier 1102 may be, for example, a unique alphanumeric code associated with a set of carts that have been deployed. The device status 1104 might indicate if a particular power load bank is "online" or "offline" and the date and time 1106 may reflect when it was added to a network. The status of inputs and outputs 1108 may show operation of each cart and the overheating warning 1110 might alert an operator about a potential problem.

Figure 12:
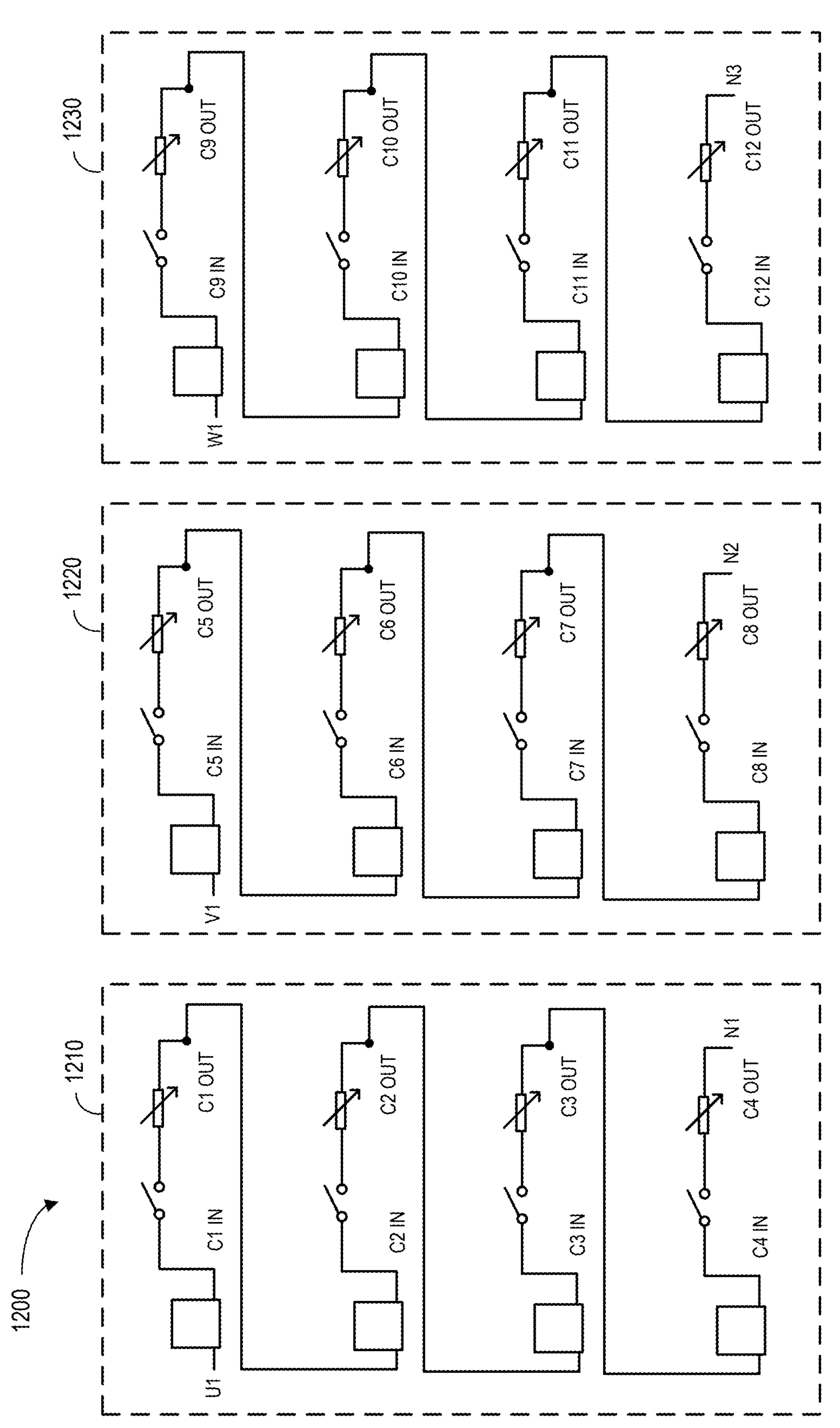
FIG. 12 is power load bank circuit according to some embodiments.

FIG. 12 is power load bank circuit 1200 for three phases 1210, 1220, 1230 according to some embodiments. The circuit 1200 is a schematic of load bank internals for 12 coils, including a circuit breaker and rheostat for each phase 1210, 1220, 1230. A 24-coil model may be simply the shown circuit (but doubled so there are 8 coils per phase instead of the 4 illustrated in FIG. 12). As resistance of the rheostat decreases from the maximum value of 200Ω, current is pulled away from each coil towards the lower resistance path offered by the rheostat. Current through each coil may be monitored using a 30 A ACS712 current sensor connected to an Arduino Mega's analog IO. The current value is displayed on the load bank's screen via a separate microprocessor, and all values are broadcast on a CAN network to all connected devices. This allows the test loop's main control station to display live current data for each coil while having an on-board backup screen for rapid current adjustment. The installed rheostats may have a usable resistance range of 0.085 mΩ to 200Ω, which if used with a coil with 10.5Ω resistance, enables an adjustable current range of 0.04 A to 4.75 A, with a 5A supply. Next to each rheostat setting, the user may also have the option of closing a switch to send the full power supply current to a coil. The circuit breaker acts like a switch to disconnect the rheostat from the coil. With the switch opened, all the current will travel through the coil providing maximum field strength.

Thus, embodiments may provide systems and methods to improve magnetic field grading for a pump. Although this is specifically useful for pipes where liquid metals are being pumped, it could be used on any liquid. Embodiments may allow for precise control and optimization of current input to each of a number of solenoids to tune the resulting magnetic field strength and direction. Controlling the current on each coil in this method allows for rapid iteration and the ability to correct settings to produce an ideal outcome in substantially real-time. The load bank may be designed for maximum current grading flexibility, as well as the ability to be responsive to user inputs, self-regulate to prevent overheating, and being portable. Moreover, the load bank enables variable coil current grading across a very large range of currents for each coil in an ALIP.

Although specific hardware configurations have been described herein, note that any number of other configurations may be provided in accordance with embodiments of the present invention (e.g., in other types of environments). Moreover, although some embodiments are focused on particular types of breakers, sensors, and rheostats, any of the embodiments described herein could be applied to other types of breakers, sensors, and rheostats. Embodiments might be associated with the transportation of a high temperature liquid being used as coolant for a nuclear reactor, molten salt for thermal energy storage tanks (e.g., to store solar and wind power energy), etc.

The present invention has been described in terms of several embodiments solely for the purpose of illustration. People skilled in the art will recognize from this description that the invention is not limited to the embodiments described but may be practiced with modifications and alterations limited only by the spirit and scope of the appended claims.

The invention claimed is:

1. A power load bank apparatus, comprising:
- an input port to receive three phases of Alternating Current ("AC") power from a power grid;
- a set of tuning elements, each tuning element including:
  - a tunable rheostat, and
  - a rheostat bypass breaker;
- an output port to provide a tuned power output to coils of a liquid pump based on tuned rheostats in the set of tuning elements;
- a cooling system to keep the power load bank at a safe temperature; and
- an interactive user display, wherein the tunable rheostats are tuned through the interactive user display and a microcontroller via solid state tuning.

2. The power load bank apparatus of claim 1, wherein the liquid pump is an Annular Linear Induction Pump ("ALIP").

3. The power load bank apparatus of claim 1, wherein the interactive user display shows sensed current values for each coil.

4. The power load bank apparatus of claim 1, further comprising:
- a set of caster wheels to facilitate positioning of the apparatus.

5. The power load bank apparatus of claim 1, further comprising:
- a plurality of output ports to provide the tuned power output.

6. The power load bank apparatus of claim 1, wherein the set of tunable elements has from 12 to 24 tunable elements.

7. The power load bank apparatus of claim 1, wherein the rheostats are also tuned via manual tuning.

8. The power load bank apparatus of claim 1, wherein the cooling system comprises a set of fans.

9. The power load bank apparatus of claim 1, wherein a load bank provides information to a control center via a communication network and power load bank hub.

10. The system of claim 9, wherein the communication network includes a Controller Area Network ("CAN").

11. The power load bank apparatus of claim 1, further comprising:
- load distribution bus bars to transmit energy.

12. The power load bank apparatus of claim 1, wherein the rheostats have a usable resistance range of 0.085 m Ω to 200 Ω.

13. A power load bank method, comprising:
- providing, via an input port, three phases of Alternating Current ("AC") power from a power grid to coils of a liquid pump;
- tuning a set of tuning elements, each tuning element including a tunable rheostat and a rheostat bypass breaker;
- providing, from an output port, a tuned power output based on tuned rheostats in the set of tuning elements;
- keeping the power load bank at a safe temperature using a cooling system; and
- interacting with an interactive user display to determine power load bank parameters, wherein the tunable rheostats are tuned through the interactive user display and a microcontroller via solid state tuning.

14. The power load bank method of claim 13, wherein the liquid pump is an Annular Linear Induction Pump ("ALIP").

15. The power load bank method of claim 14, further comprising:
- showing sensed current values for each coil on the interactive user display.

16. The power load bank method of claim 13, wherein the set of tunable elements has from 12 to 24 tunable elements.

17. The power load bank method of claim 13, wherein the rheostats are also tuned via at least one of: (i) manual tuning, and (ii) solid state tuning through the interactive user display and a microcontroller.

* * * * *